United States Patent [19]

Yoshikawa

[11] Patent Number: 4,778,123
[45] Date of Patent: Oct. 18, 1988

[54] DRAG ADJUSTING DEVICE FOR A CLOSED-FACE TYPE FISHING REEL

[75] Inventor: Osamu Yoshikawa, Sakai, Japan

[73] Assignee: Shimano Industrial Company Limited, Osaka, Japan

[21] Appl. No.: 86,472

[22] Filed: Aug. 18, 1987

Related U.S. Application Data

[60] Division of Ser. No. 885,743, Jul. 21, 1986, Pat. No. 4,696,437, which is a continuation of Ser. No. 740,520, Jun. 3, 1985, abandoned.

[51] Int. Cl.$^4$ .................. A01K 89/01; A01K 89/02
[52] U.S. Cl. .................. 242/84.2 R; 188/72.7; 188/106 R; 242/84.53
[58] Field of Search .................. 242/84.2 R, 84.2 A, 242/84.21 R, 84.21 A, 84.5 A, 84.51 A, 84.53, 84.5 R; 188/72.1, 72.7, 72.8, 106 R

[56] References Cited

U.S. PATENT DOCUMENTS

| | | | |
|---|---|---|---|
| 1,995,221 | 3/1935 | Peel et al. | 242/84.5 R |
| 2,988,298 | 6/1961 | Purnell | 242/84.5 R |
| 3,017,135 | 1/1962 | Wood, Jr. | 242/218 |
| 3,023,978 | 3/1962 | Denison et al. | 242/84.5 A |
| 3,044,730 | 7/1962 | Yeada | 242/84.5 A |
| 3,120,357 | 2/1964 | Wood, Jr. | 242/84.5 A |
| 3,481,554 | 12/1969 | Hull | 242/84.2 A |
| 3,697,011 | 10/1972 | Christensen et al. | 242/84.2 A |
| 4,156,510 | 5/1979 | Hull | 242/84.5 R |
| 4,634,073 | 1/1987 | Coquelet | 242/84.5 A |
| 4,676,451 | 6/1987 | Dispas | 242/84.5 A |
| 4,696,437 | 9/1987 | Yoshikawa | 242/84.2 A X |
| 4,702,430 | 10/1987 | Saito | 242/84.21 R X |

*Primary Examiner*—Stuart S. Levy
*Assistant Examiner*—Joseph J. Hail, III
*Attorney, Agent, or Firm*—Stevens, Davis, Miller & Mosher

[57] ABSTRACT

A drag adjusting device for a closed-face type fishing reel is provided which has a spool rotatably supported at the front of a reel body, a mounting leg below the spool, a brake plate provided between the spool and the reel body and a drag actuating plate extending at both ends radially of the spool for urging the brake plate in one direction to apply a braking force to the spool. A drag setting thumb nut is operatively engaged with one lengthwise end of the drag actuating plate to change the position thereof with respect to the spool in order ot set the braking force to be applied to the spool. An adjusting member in operative engagement with the other lengthwise end of the drag actuating plate adjusts the braking force set by the setting thumb nut.

2 Claims, 5 Drawing Sheets

DRAG ADJUSTING DEVICE FOR A CLOSED-FACE TYPE FISHING REEL

This is a division of application Ser. No. 885,743, filed July 21, 1986, now U.S. Pat. No. 4,696,437, which in turn is a continuation of application Ser. No. 740,520, filed June 3, 1985, now abandoned.

FIELD OF THE INVENTION

This invention relates to a drag adjusting device for a closed-face type fishing reel, and more particularly to a drag adjusting device for a closed-face type fishing reel in which a spool is supported rotatably at the front of a reel body a mounting leg is positioned below the spool, the spool is covered by a spool cover, with the drag adjusting device being adapted to apply an adjustable braking force against rotation of the spool.

BACKGROUND OF THE INVENTION

Generally, closed-face fishing reels are provided with a drag adjusting device which applies a braking force to a spool supported rotatably to the reel body to apply a resistance against rotation of the spool caused by a pull of a hooked fish. The braking force is adjusted in order to avoid an escape of the hooked fish or the cut of a fishing line.

The drag adjusting device comprises a drag actuating plate supported at one end to the reel body and a dragging thumb nut engageable with the drag actuating plate, the thumb nut being screwed rotatably with the upper portion of the reel body opposite to the lower portion thereof carrying the mounting leg and is rotated to adjust the braking force.

Therefore, the braking force is not largely and quickly adjustable, thereby creating a problem in that slow adjustment may result in an escape of the hooked fish or a cut of the fishing line.

SUMMARY OF THE INVENTION

An object of the invention is to provide a drag adjusting device which can previously set a predetermined braking force and quickly adjust it corresponding to a pull of the hooked fish.

The present invention is characterized in that a drag adjusting device for applying a braking force against rotation of a spool supported rotatably to the closed-face type fishing reel is provided at one axial side of the spool with a brake plate and a drag actuating plate extending radially of the spool. On the reel body at a side of one lenghtwise end of the drag actuating plate is provided a drag setting thumb nut which urges the drag actuating plate to move relative to the spool and sets the braking force at a desired value to be given to the spool. The thumb nut operates in association with one lengthwise end of the drag actuating plate. On the reel body at a side of the other lengthwise end of the drag actuating plate is provided an adjusting member operating in association wth the other lengthwise end of the drag actuating plate to adjust the braking force set by the thumb nut.

The adjusting member mainly is lever-like-shaped or slider-like-shaped and is supported movably in reciprocation with respect to the reel body so that the braking force set by the thumb nut can be quickly adjusted to increase or decrease by means of the reciprocation of the adjusting member. Hence, the quick adjustment of the braking force corresponding to a pull of a hooked fish can reliably prevent an escape of the hooked fish or a cut of the fishing line.

In addition, in order to easily carry out quick adjustment of the braking force by use of the adjusting member, in a first embodiment in FIGS. 1 and 2, the thread pitch of a screw member of the adjusting member is made larger than that of the drag setting thumb nut, or in a second embodiment in FIGS. 3 through 6, a cam body is used.

These and other objects of the invention will become more apparent in the detailed description and examples which follow.

DETAILED DESCRIPTION OF THE INVENTION

Figure 1:
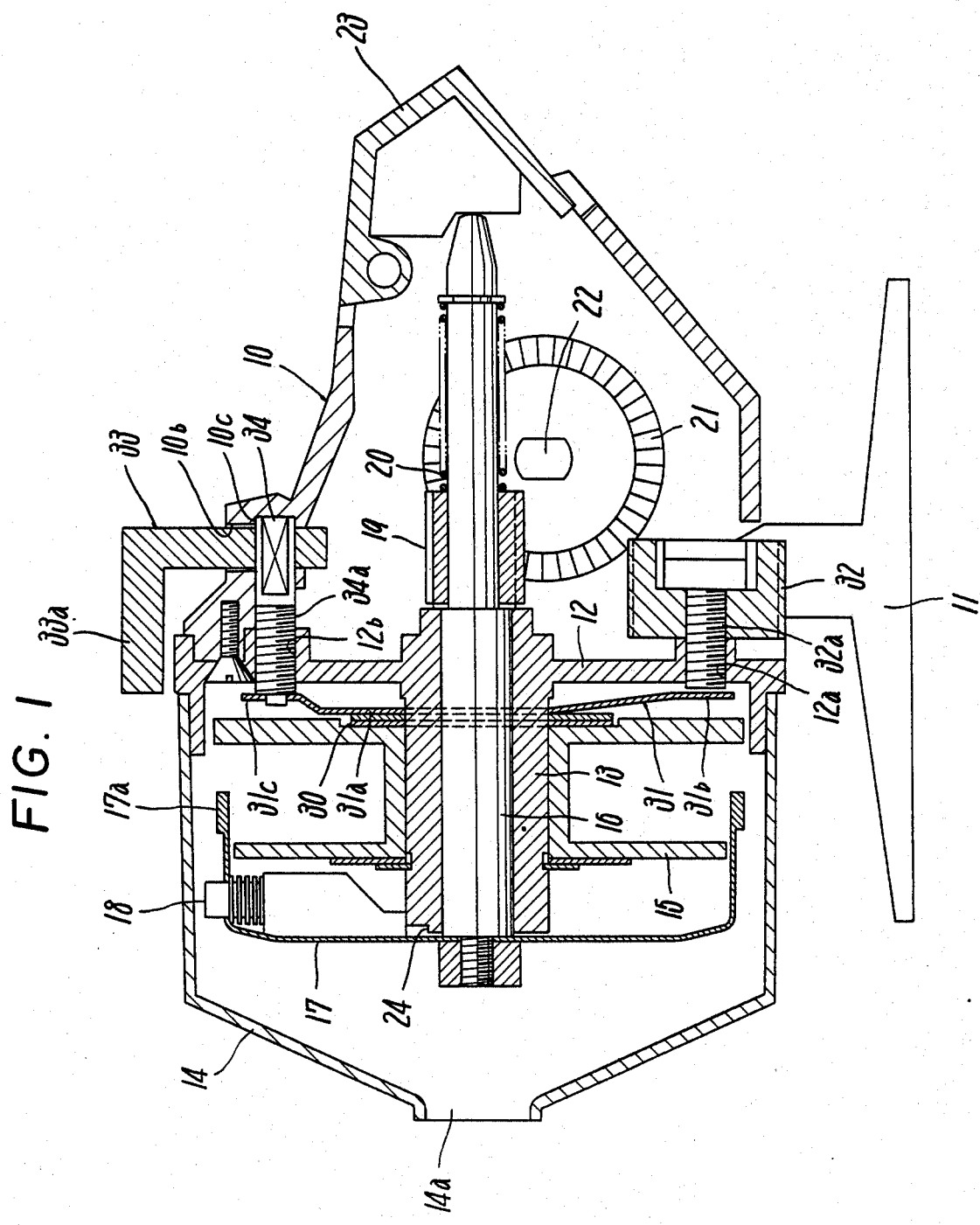
FIG. 1 is a generally sectional view of a closed-face type fishing reel provided with a drag adjusting device according to a first embodiment of the invention.

Referring to FIG. 1., a closed-face type fishing reel of usual construction is shown, which is provided with a reel body 10 having a mounting leg 11 below, a disc-like-shaped support frame 12 is fixed to the front of the reel body 10 and has at its center a tubular shaft 13. A cup-shaped apool over 14 has at its front and a fishing line guide bore 14a and is mounted detachably on the outer periphery of the support frame 12. A spool 15 is supported rotatably to the outer periphery of the tubular shaft 13, and a rotary shaft 16 is supported rotatably and axially slidably into a center bore of the tubular shaft 13. A cup-shaped rotary member 17 having an annular edge 17a is mounted on the fore end of the rotary shaft 16, and the rotary member 17 carries a line guide 18 which guides a fishing line to be wound on the spool 15 and moves in advance or retreat radially of the rotary member 17. Also, a pinion 19 is supported axially slidably to the rotary shaft 16 at its shaft portion entering into the reel body 10, and a return spring 20 for biasing the rotary shaft 16 rearwardly of the reel body 10 is interposed between the pinion 19 and the rotary shaft 16. A hand shaft 22 having a master gear 21 engageable with the pinion 19 is supported rotatably to one side of the reel body 10 and, an operating lever 23 for operating the rotary shaft 16 is pivoted to the rear portion of reel body 10 and is pushed to move the rotary shaft 16 and cup-like-shaped rotary member 17 forwardly of the reel body 10 against the return spring 20. Line guide 18 is retracted into the rotary member 17 to release the line from the line guide 18, and the handle shaft 22 is rotated to rotate the rotary shaft 16 and rotary member 17 so as to advance the line guide 18 outwardly therefrom, so that the line is wound to the spool 15 through the line guide 18. In addition, at the outer periphery of the front end of tubular shaft 13 is provided a cam body 24 which is round and shifts at the center from the axis of tubular shaft 13 so that the highest portion at the cam body 24, that is, the portion most remote from the axis of tubular shaft 13, is level with the outer periphery of tubular shaft 13 and the lowest portion diametrically symmetrical to or opposite to the highest portion is nearest to the axis of tubular shaft 13. Hence, the rotary member 17 moves forwardly of the reel body 10 so that the line guide 18 falls into the lowest portion at the cam body 24 and retracts into the rotary member 17. Also, under this condition, the rotary member 17 rotates to raise the line guide 18 onto the highest portion at the cam body 24 and advance it outwardly from the rotary member 17. In addition, the support frame 12 and tubular shaft 13 may be integral with the reel body 10.

The drag adjusting device of the invention used in the closed-face type fishing reel constructed as foregoing comprises a brake plate 30, a drag actuating plate 31 extending at both ends radially of the spool 15 to urge the brake plate 30 toward the lateral side of spool 15 to thereby apply thereto a braking force, a drag setting thumb nut 32 operating in association with one lengthwise end of the drag actuating plate 31 to change the position thereof with respect to the spool 15 to thereby set the amount of braking force to be given thereto, and an adjusting member 33 in association with the other lengthwise end of drag actuating plate 31 to adjust the braking force set by the thumb nut 32. In the FIG. 1 embodiment, the thumb nut 32 is arranged below the reel body and the adjusting member 33 above the same.

Figure 2:
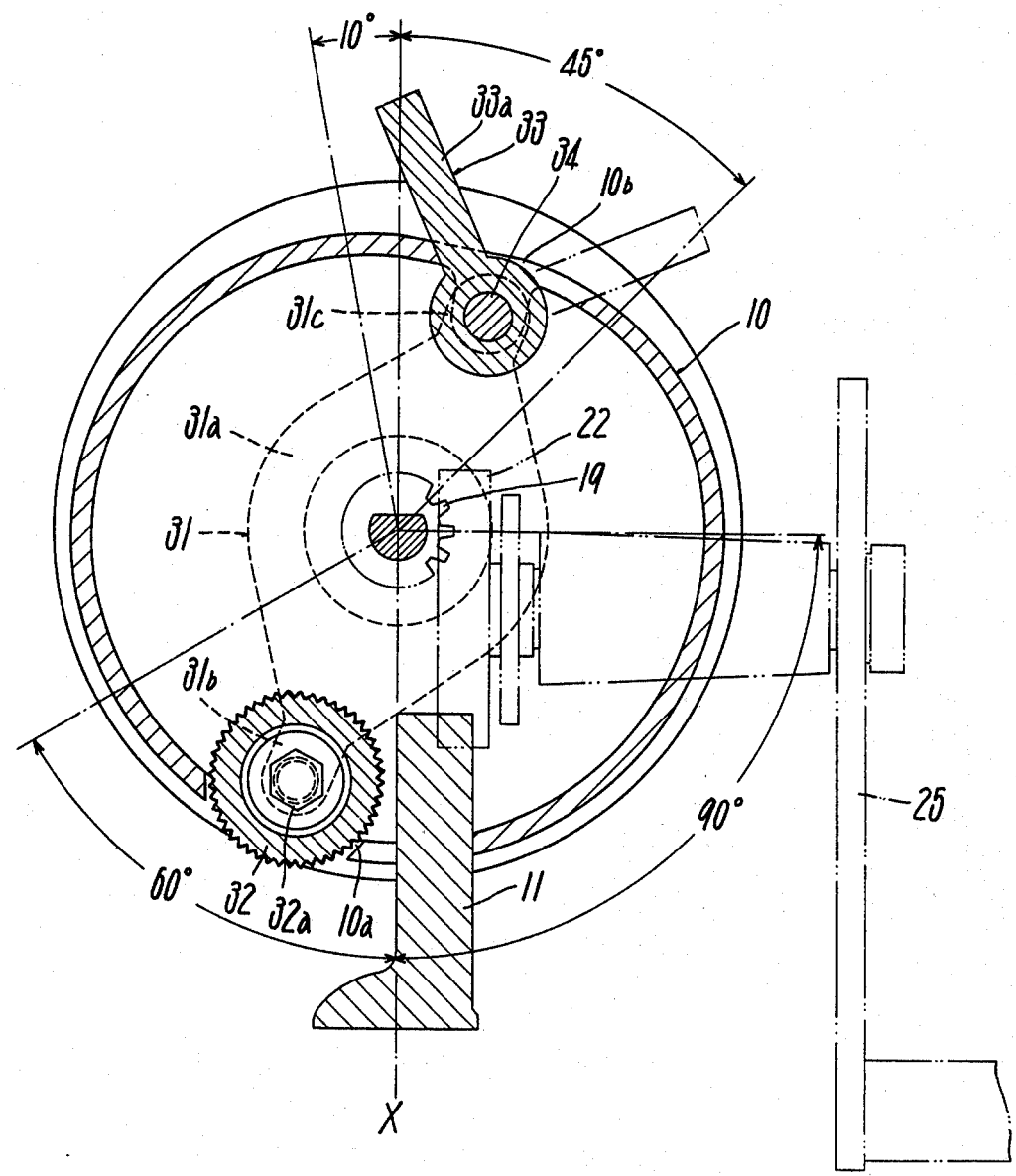
FIG. 2 is a sectional view of the FIG. 1 drag adjusting device, showing a drag setting thumb nut and an adjusting member at the mounting portions thereof.

In the aforesaid construction, the brake plate 30 is supported axially slidably onto the outer periphery of the tubular shaft 13 and the drag actuating plate 31 is disposed between the spool 15 and the support frame 12 and, as shown in FIG. 2, comprises an axially curved annular plate portion 31a, a first associate plate portion 31b projecting radially outwardly from the annular plate portion 31a and bending axially thereof toward the thumb nut 32, and a second associate plate portion 31c projecting radially outwardly from the plate portion 31a at the position diametrically symmetrical to or opposite to the first associate plate portion 31b.

The drag setting thumb nut 32 is circumferentially indented, provided at the center with a screw bolt 32a, disposed below the reel body 10 and projecting in part therefrom through a cutout 10a, and suported to a threaded bore 12a provided at the support frame 12 rotatably but not axially movably through the screw bolt 32a. Screw bolt 32a abuts at the utmost and against the first associate plate portion 31b so that the setting thumb nut 32 is rotated to urge the drag actuating plate 31 at one lengthwise end 31b toward the spool 15. Also, the drag setting thumb nut 32, as shown in FIG. 2, is disposed at the reverse side to the handle mounting side and shifts by an angle of 22° with respect to the center line X passing through the axis of reel body 10 and extending vertically thereof. Alternatively, the drag setting thumb nut 32 may be diposed within a range of an angle of 90° at the handle 25 mounting side and an angle of 60° at the reverse side thereto with respect to the center line X.

The adjusting member 33 is lever-shaped, disposed at the upper portion of reel body 10 to provide a projecting lever 33a from the reel body 10 through a cutout 10b formed thereon. Adjusting member 33 is supported swingably to the reel body 10 through a shaft 34 having a threaded portion 34a and fitted into a support bore 10c at the reel body 10. Threaded portion 34a screws with a threaded bore 12b formed at the support frame 12. The second associate plate portion 31c at the drag actuating plate 31 is retained to the utmost end of shaft 34, so that the adjusting member 33 is operated in swinging motion to urge the drag actuating plate 31 at the second associate plate portion 31c side toward the spool 15. Also, the adjusting member 33, as shown in FIG. 2, is disposed shifting by an angle of 22° with respect to the center line X, which may alternatively be provided in a range of an angle of 45° at the handle mounting side and an angle of 10° at the reverse side thereto with respect to the center line X.

The lever-like-shaped adjusting member 33, which is disposed at the upper portion of reel body 10 and at the reverse side to the handle mounting side, is operable by an angler such that he can operate the adjusting member 33 by the finger of his hand gripping the reel body 10 while rotating the handle for fishing, thereby facilitating adjustment of the braking force set by the thumb nut 32.

Furthermore, the adjusting member 33 can adjust the braking force by an amount larger than that achievable by the drag setting thumb nut 32. In other words, the adjusting member 33 of the screw bolt type in FIG. 1 has a larger thread pitch of the threaded portion 34a at the shaft 34 than that of the screw bolt 32a for the drag setting thumb nut 32. Accordingly, the adjusting member 33 can largely and quickly adjust the braking force corresponding just to a pulling force by the hooked fish, thereby reliably preventing an escape thereof or a cut in the fishing line.

The thumb nut 32, which is set to apply a desired braking force to the spool 15 prior to the casting, is disposed at the lower portion of reel body 10 so as to avoid contact with the finger of the angler's hand which is used to operate the adjusting member 33 while gripping the fishing rod and reel, whereby the angler can operate the adjusting member 33 without being hindered by the drag setting thumb nut 32 and also there is no risk that the thumb nut 32 will be carelessly operated.

Alternatively, a drag setting thumb nut 320 and an adjusting member 330 may be gathered at, for example, the upper portion of reel body 10 as shown in FIGS. 3 through 6.

A second embodiment of the invention will be shown in FIGS. 3 through 6, in which the adjusting member 330 is supported slidably onto the outer surface of reel body 10 and a leg 330a of the adjusting member 330 projects into the reel body 10 through an opening 10d and supports an associate bar 35. A base 26 is provided at the lower portion of reel body 10 and pivotally supports through a pin 27 a cam body 36 in association with the associate bar 35. An associate shaft 37 engageable with the cam face of cam body 36 is supported axially movably to the support frame 12, and a second associate plate portion 310c at a drag actuating plate 310 is retained to the utmost end of associate shaft 37, so that the adjusting member 330 is slidably moved to rotate the cam body 36 through the associate bar 35 and the associate shaft 37 axially moves through its engagement with cam body 36, thereby urging the second associate plate portion 310c toward the brake plate 300.

Figure 6:
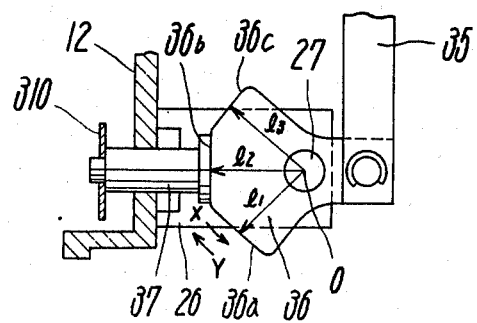
FIG. 6 is a partially plan view explanatory of association of the adjusting member with the drag actuating plate.

The cam body 36, as shown in FIG. 6, is formed of a plate which has at one end a plurality of cam faces 36a, 36b, and 36c different from each other stepwise in length from the pivot position O to the base 26 and which is pivoted at the other end to the associate bar 35. In addition, lengths $l_1$, $l_2$ and $l_3$ between the cam faces and the pivot position O have therebetween a relation of $l_1 < l_2 < l_3$.

Figure 5:
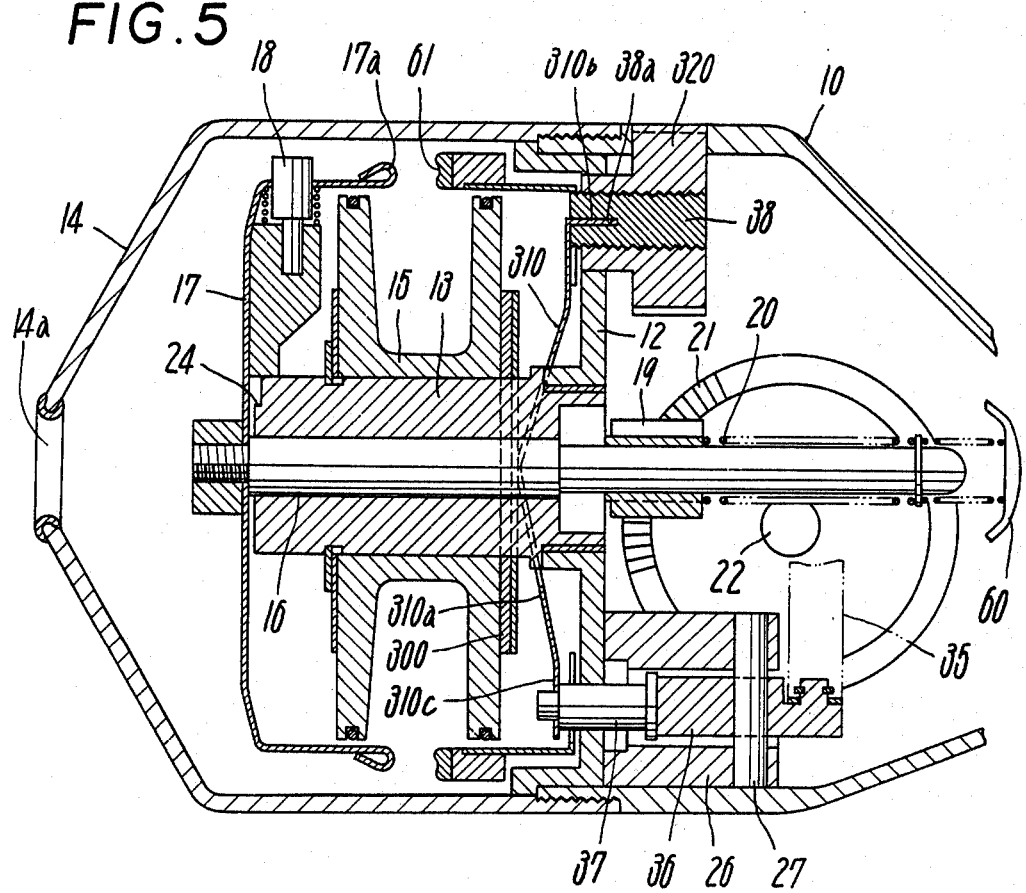
FIG. 5 is a sectional view taken on the line V—V in FIG. 4.

A drag setting thumb nut 320 in association with a first associate plate portion 310b at the drag actuating plate 310 is formed basically the same as in the first embodiment and is supported to the reel body 10 in relation of being not axially movable but rotatable only. A separate threaded shaft 38, as shown in FIG. 5, screws with the thumb nut 320 and has at the utmost end a recess 38a insertably engageable with the first associate plate portion 310b so that the thumb nut 320 is rotatably operated to axially move the threaded shaft 38, thereby urging the drag actuating plate 310 toward the brake plate 300.

Figure 4:
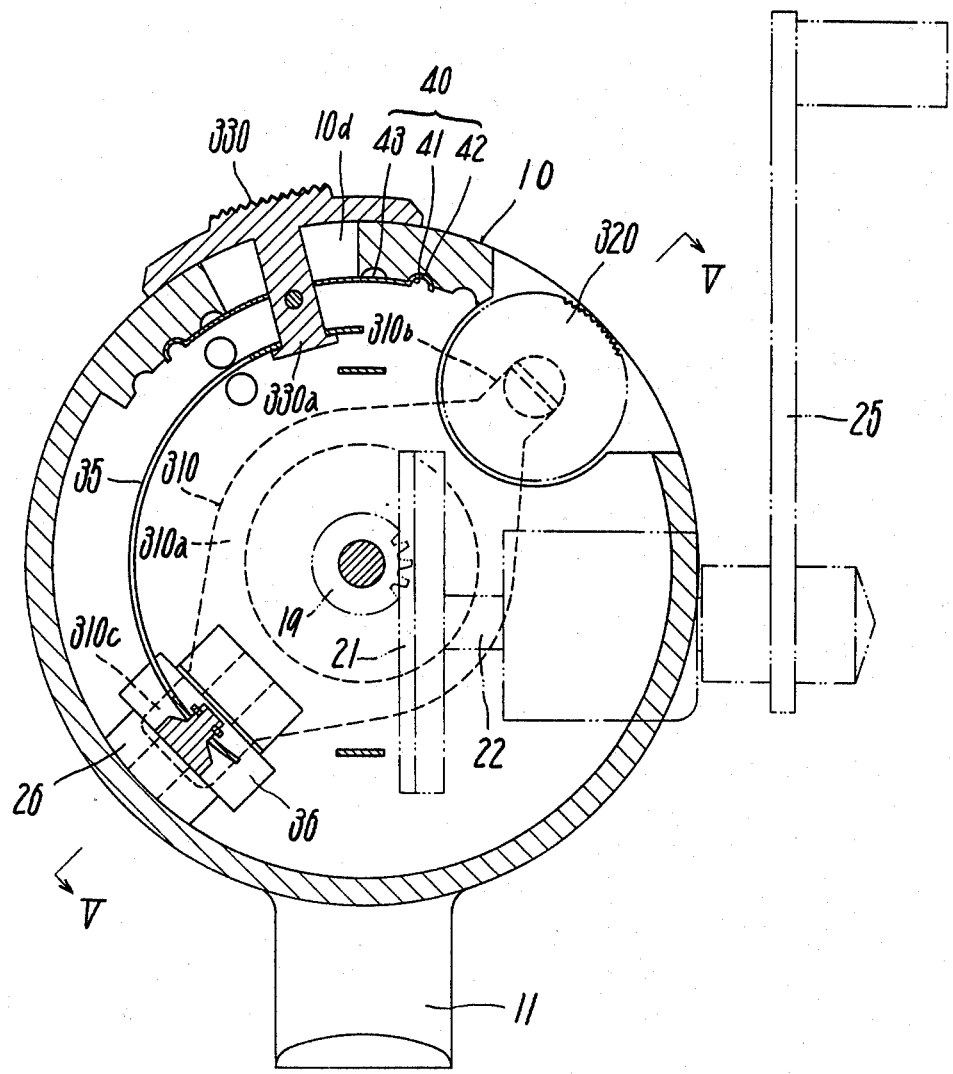
FIG. 4 is a sectional view of the mounting portion of the drag setting thumb nut and adjusting member in the FIG. 3 embodiment, corresponding to FIG. 2.

The closed-face type fishing reel using the second embodiment of the drag adjusting device of the invention, as shown in FIG. 4, is provided between the adjusting member 330 and the reel body 10 with a positioning mechanism 40, by which the adjusting member 330 is set stepwise in its operating position and held thereat. The positioning mechanism 40 comprises, for example, a plurality of engaging recesses 41, retainers 42 each engageable with a selective one of recesses 41 and, an elastic body 43, such as a leaf spring, for carrying the retainer 42. Engaging recesses 41 are provided at the reel body 10, and the elastic member 43 at the adjusting member 330. In addition, in order to hold the adjusting member 330 in its operating position, a predetermined resistance, other than the use of positioning mechanism 40, may be applied to movement of adjusting member 330.

Figure 3:
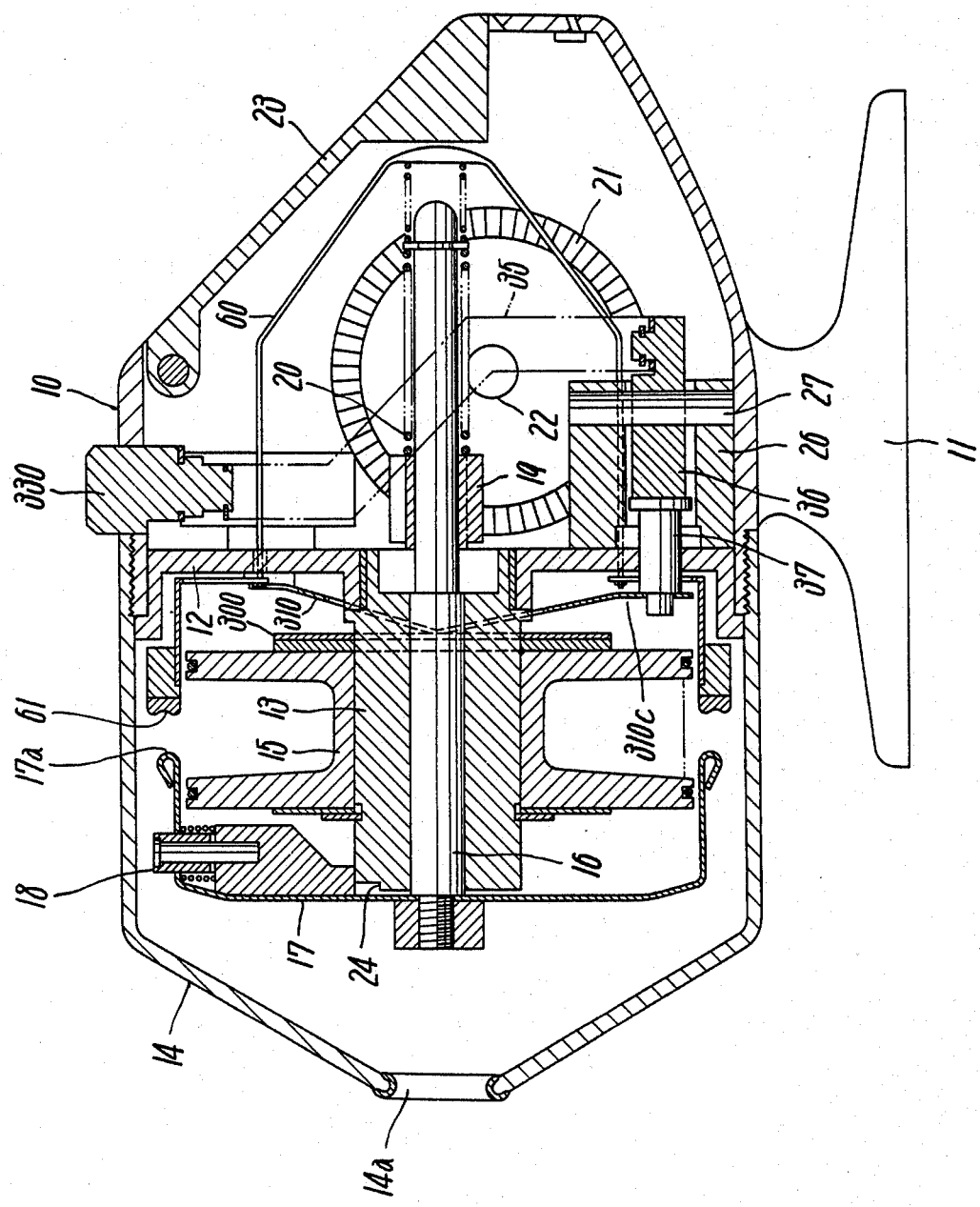
FIG. 3 is a generally sectional view of a closed-face type fishing reel provided with a modified embodiment of the drag adjusting device of the invention.

Also, the reel body 10, as shown in FIG. 3, is provided with an actuating member 60 which moves in association with the operating lever 23 axially of the rotary shaft 16. Actuating member 60 provides an annular line snubber 61 opposite to the annular edge 17a of rotary member 17, so that when the operating lever 23 is pushed for casting, the actuating member 60 only is moved to press-contact the line snubber 61 with the annular edge 17a to grab therebetween the fishing line drawn out from the spool 15. Thereafter, when the operating lever 23 is further pushed, the rotary shaft 16, rotary member 17 and actuating member 60 axially move while grabbing the line, so as to move the line guard 18 backwardly to release the line therefrom.

The drag adjusting device constructed as described above functions to adjust the barking force the same as in the first embodiment. For example, when the adjusting member 330 is moved clockwise in FIG. 4, its operating force is transmitted to the cam body 36 through the associate bar 35, the cam body 36 rotates in the direction of the arrow X in FIG. 6 to push the associate shaft 37, thereby increasing an urging force of the drag actuating plate 310 toward the brake plate 300 and increasing the braking force more than that set by the drag setting thumb nut 320. On the other hand, when the adjusting member 330 is moved counterclockwise in FIG. 4, the cam body 36 rotates in the direction of the arrow Y in FIG. 6, thereby decreasing the aforesaid urging force and the braking force. Thus, the use of cam body 36 having a plurality of cam faces can adjust the braking force by the adjusting member 330 in a plurality of stages and also the adjusting member 330 is held in its operating position by the positioning mechanism 40 as above-mentioned.

Alternatively, in the second embodiment, the threaded shaft 38 for operating the thumb nut 320 in association with the drag actuating plate 310 and the associate bar 35, cam body 36 and associate shaft 37 for operating the adjusting member 330 in association with the plate 310, may be replaced by other association means.

Also, the adjusting member 330 may be movable longitudinally of the reel body 10, or may be pivoted thereto as in the first embodiment.

Although several embodiments have been described, they are merely exemplary of the invention and not to be construed as limiting, the invention being defined solely by the appended claims.

What is claimed is:

1. In a closed-face type fishing reel including a reel body, a handle, a spool supported rotatably to said reel body, and a drag adjusting device for applying a braking force against rotation of said spool, said drag adjusting device comprising:

a brake plate disposed at one axial side of said spool, a drag actuating plate having two lengthwise ends (i) extending radially of said spool, (ii) disposed substantially 180° opposite one another and (iii) urging said brake plate toward a side of said spool to apply a braking force to said spool, a drag setting thumb nut operatively enagaged with one lengthwise end of said drag actuating plate for changing a position of said drag actuating plate with respect to said spool and for setting the braking force to be applied to said spool, an adjusting member operatively engaged with another lengthwise end of said drag actuating plate for adjusting the braking force set by said drag setting thumb nut by operation of said adjusting member in an amount larger than that adjusted by operation of said thumb nut, wherein said drag setting thumb nut and said adjusting member are both disposed at an upper portion of said reel body, said adjusting member being disposed at a radial position farther radially outwardly than a position at which said thumb nut is disposed, said thumb nut being located at a position between said adjusting member and said handle.

2. In a closed-face type fishing reel including a reel body, a spool supported rotatably to said reel body, and a drag adjusting device for applying a braking force against rotation of said spool, said drag adjusting device comprising:

a brake plate disposed at one axial side of said spool, a drag actuating plate having two lengthwise ends (i) extending radially of said spool, (ii) disposed substantially 180° opposite one another and (iii) urging said brake plate toward a side of said spool to apply a braking force to said spool, a drag setting thumb nut operatively engaged with one lengthwise end of said drag actuating plate for changing a position of said drag actuating plate with respect to said spool and for setting the braking force to be applied to said spool, an adjusting member operatively engaged with another lengthwise end of said drag actuating plate for adjusting the braking force set by said drag setting thumb nut by operation of said adjusting member in an amount larger than that adjusted by operation of said thumb nut, wherein said adjusting member is movably supported to reciprocate with respect to said reel body and said drag adjusting device further comprises an adjusting means responsive to reciprocation of said adjusting member for adjusting the braking force set by said drag setting thumb nut in an amount larger than that adjusted by operation of said drag setting thumb nut, and a positioning mechanism disposed between said adjusting member and said reel body, said positioning mechanism being movable with said adjusting member and comprising an elastic body having a plurality of retainers, said reel body including a plurality of engaging recesses, said retainers being selectively engageable with said engaging recesses when said positioning mechanism and said adjusting member are moved relative to said reel body, and wherein said adjusting means comprises (i) a cam member pivotably supported at a pivot axis to said reel body and having a plurality of cam faces, said cam faces being positioned at different distances from said pivot axis to provide a stepped cam contour, (ii) an association bar attached to said adjusting member, said association bar being engaged with said cam member such that operation of said adjusting member causes pivoting movement of said cam member about said pivot axis, and (iii) an association member engaging at one end with said another lengthwise end of said drag actuating plate and at another end with said cam contour such that said pivoting movement moves said association member which moves said another lengthwise end of said drag actuating plate to step-wise adjusted positions to adjust the braking force set by said drag setting thumb nut.

* * * * *